(12) United States Patent
Nagel

(10) Patent No.: US 6,460,327 B1
(45) Date of Patent: Oct. 8, 2002

(54) INTERNAL COMBUSTION ENGINE

(75) Inventor: Edmund Ferdinand Nagel, Feldkirch (AT)

(73) Assignee: Siegfried Nagel, Egg (AT)

( * ) Notice: Subject to any disclaimer, the term of this patent is extended or adjusted under 35 U.S.C. 154(b) by 0 days.

(21) Appl. No.: 09/653,043

(22) Filed: Sep. 1, 2000

Related U.S. Application Data

(63) Continuation of application No. PCT/AT99/00052, filed on Mar. 1, 1999.

(30) Foreign Application Priority Data

Mar. 2, 1998 (AT) ............................................. A 361/98
May 27, 1998 (AT) ............................................. A 910/98

(51) Int. Cl.$^7$ ................................................. F02C 5/00
(52) U.S. Cl. ...................................... 60/39.6; 417/381
(58) Field of Search ................ 60/597, 39.6; 417/380, 417/381

(56) References Cited

U.S. PATENT DOCUMENTS 5,222,466 A    6/1993   Gratziani
5,419,686 A * 5/1995   Wissmann et al. .......... 417/380
5,615,643 A * 4/1997   Hill ........................ 417/380 X
5,687,671 A    11/1997   Gates

FOREIGN PATENT DOCUMENTS

| DE | 2216082 | 10/1973 |
| DE | 4232566 | 4/1994 |
| RU | 1749554 | 7/1992 |
| WO | 9801338 | 1/1998 |

* cited by examiner

*Primary Examiner*—Hoang Nguyen
(74) *Attorney, Agent, or Firm*—Sidley Austin Brown & Wood, LLP

(57) ABSTRACT

A combustion engine including a combustion chamber for combusting a fuel in an explosion cycle, and a separate pump chamber, connected with the combustion chamber and having a liquid inlet opening through which pump liquid flows into the pump chamber, and a liquid outlet opening, through which the pump liquid is expelled from the pump chamber under the action of combustion gas formed in an explosion cycle, wit the separate pump chamber being divided by at least one flexible diaphragm into a gas space and a liquid space so that the combustion gas, with flows out of the combustion chamber into the separate pump chamber, displaces the flexible membrane against the pump liquid.

17 Claims, 14 Drawing Sheets

INTERNAL COMBUSTION ENGINE

RELATED APPLICATION

This application is a continuation of International Application PCT/AT99/00052, filed Mar. 1, 1999 and designating the United States.

BACKGROUND OF THE INVENTION

1. Field of Invention

The invention relates to an internal combustion engine including a combustion chamber for combusting a fuel in an explosion cycle, and a pump chamber which is connected with the combustion chamber and which is filled with a pump liquid through a liquid inlet opening, with the pump liquid being expelled from the liquid outlet opening under the action of the combustion gas formed in the explosion cycle.

2. Description of the Prior Art

A combustion engine of the type discussed above is known, for example, from the WO 98/01338. In the known internal combustion engine, a plurality of pump chambers, from which the pump liquid is expelled under the direct action of the inflowing combustion gas, is assigned to a single combustion chamber.

An object of the present invention is to improve the efficiency of the internal combustion engine of the type discussed above.

SUMMARY OF THE INVENTION

This and other objects of the present invention which will become apparent hereinafter, are achieved by dividing the pump chamber by a flexible diaphragm into a gas chamber and a liquid chamber.

Because of the division of the pump chamber with a flexible diaphragm into a gas space and a liquid space, there can be no mixing between the combustion gas and the pump liquid, which would have lead to a decrease in efficiency. Furthermore, the combustion gas is not divided among several pump chambers, as a result of which the overall construction can be simplified.

Under the action of the combustion gas flowing out of the combustion space, the diaphragm is displaced from its first operational position, in which the liquid chamber takes up essentially the whole volume of the pump chamber, into its second operational position, in which the gas space occupies essentially the whole volume of the pump chamber, with the pump liquid being forced out of the outlet opening of the space chamber. In a subsequent implosion cycle, a cooling liquid can be sprayed with a spraying device into the gas space of the pump chamber, as a result of which, because of the cooling of the hot combustion gas, a reduced pressure is produced in the pump chamber, whereby the diaphragm is pushed in the direction of its first operational position, and a new charge of pump liquid can be pumped into the liquid space of the pump chamber. Due to the spraying of cooling liquid into the pump chamber, the surface of the diaphragm, facing the gas space, can furthermore advantageously be wetted with cooling liquid, and a film, which protects the diaphragm against the high temperature of the combustion gas, can be formed.

The division of a pump chamber into the gas space and the liquid space can be accomplished by a single elastic diaphragm or by several elastic diaphragms, which are formed, for example, in the form of a tube.

Advantageously, the combustion chamber forms part of a circuit for the pump liquid and which also includes a turbine. In a particularly preferred embodiment, this turbine is a radial turbine.

Advantageously, an interim reservoir, which can be filled with pump liquid and emptied in the implosion cycle, is connected with the outlet of the turbine. Due to the use of such an interim reservoir, which in timed fashion can be filled with liquid or emptied of liquid, the total volume of pump liquid can be decreased significantly in contrast to the known oscillating liquid circuit disclosed in the WO 98/01338 and, accordingly, a significantly smaller, lighter and more rapidly reacting combustion engine can be produced.

Advantageously, the liquid flows essentially radially not only in the turbine, but also in the pump chamber and/or in the interim reservoir, as result of which a low overall height and, with that, a high, maximum attainable number of cycles of the engine can be obtained.

BRIEF DESCRIPTION OF THE DRAWINGS

Further advantages and details of the present invention will be explained in detail below with reference to the attached drawings, wherein.

DETAILED DESCRIPTION OF THE PREFERRED EMBODIMENT

Figure 1:
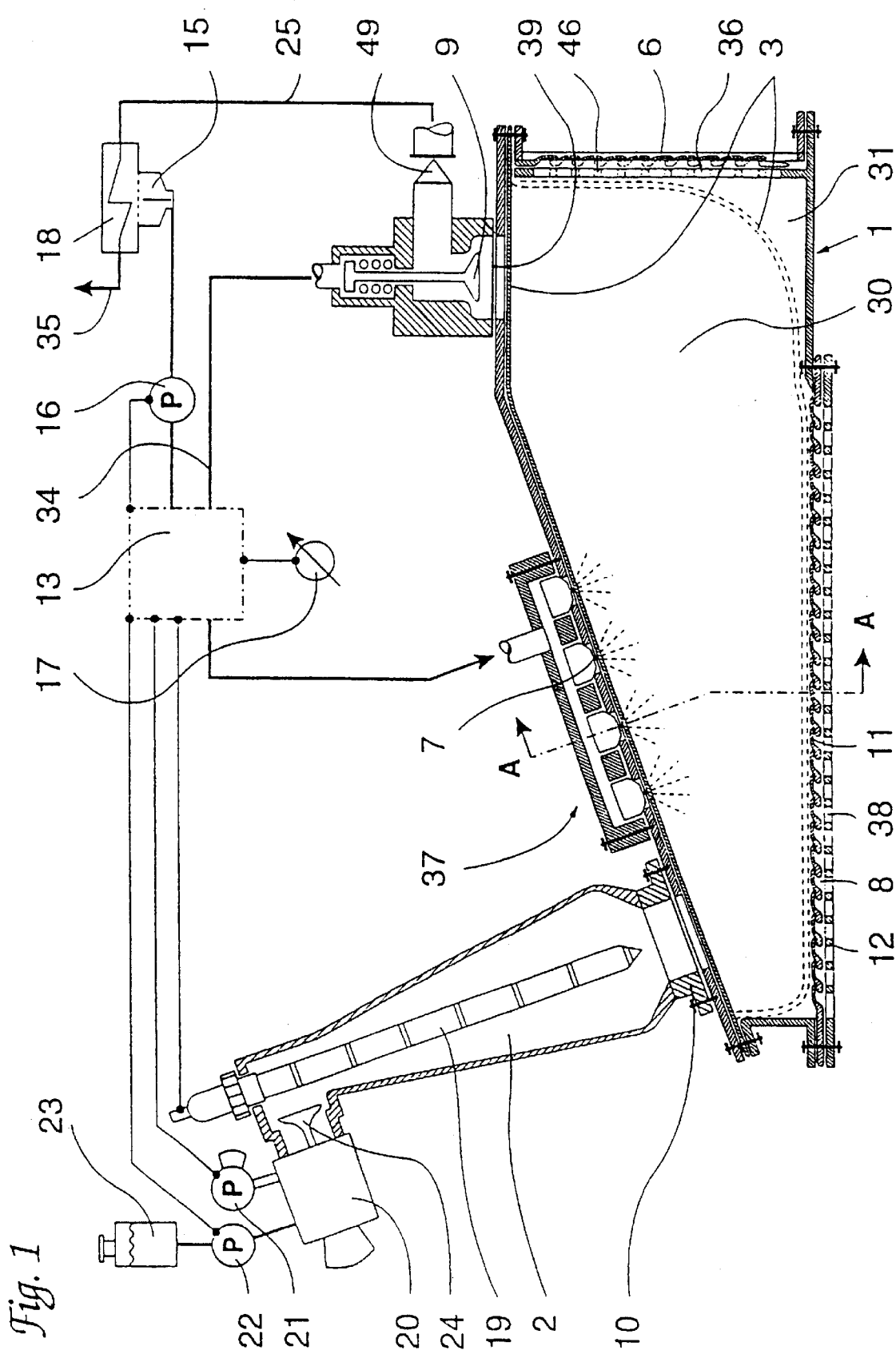
FIG. 1 shows a diagrammatic longitudinal sectional view of an inventive combustion engine.
Figure 2:
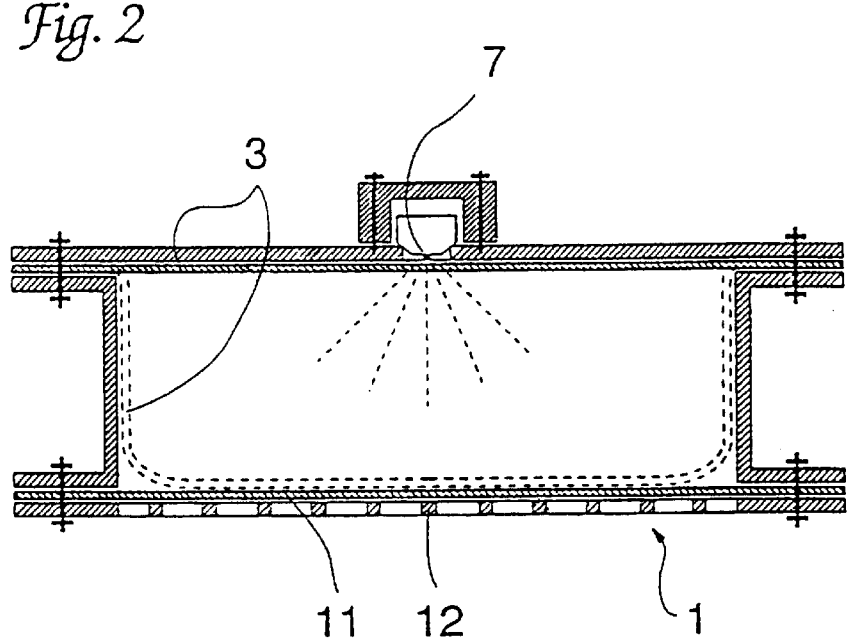
FIG. 2 shows a cross-sectional view through the pump chamber along the line A—A in FIG. 1.
Figure 3:
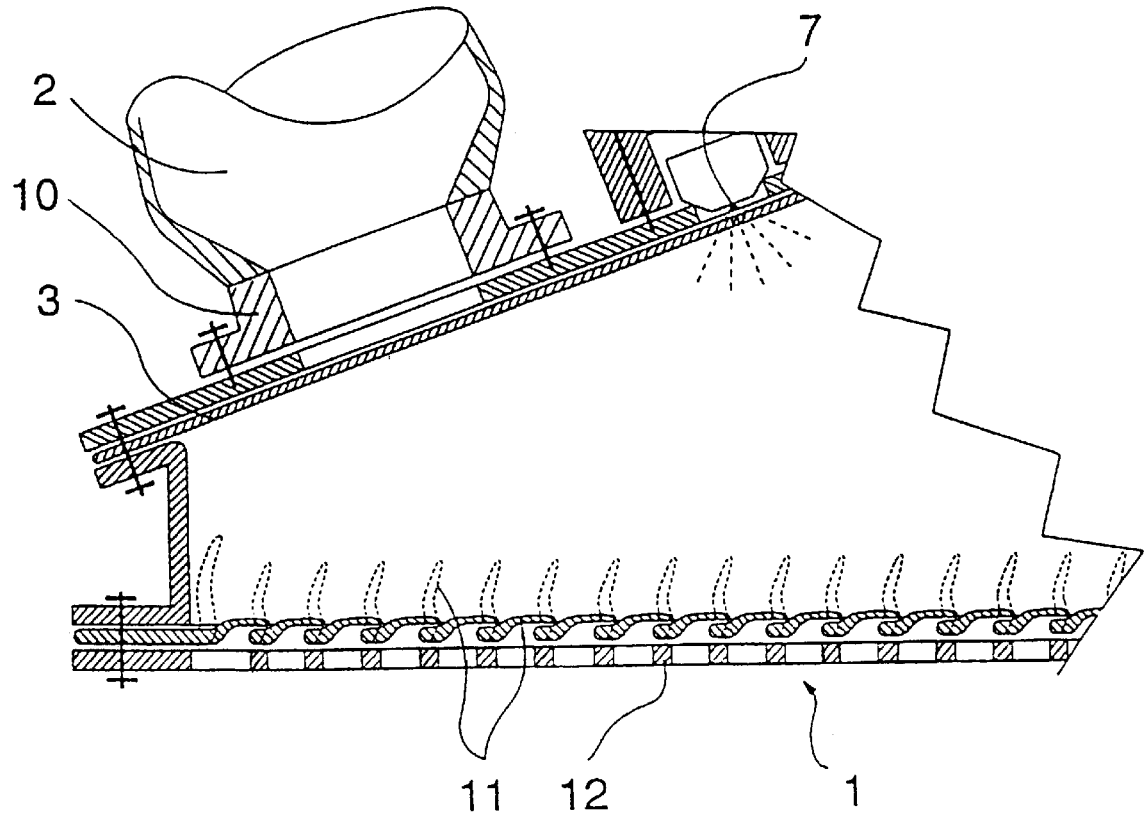
FIG. 3 shows an enlarged cross-sectional view of a portion of FIG. 1.

A combustion engine according to the present invention, which shown in FIGS. 1 to 3, includes a combustion chamber 2 which is filled with a working gas, which is formed in a carburetor 20 and is under atmospheric pressure in the combustion chamber 2, to start the engine. For this purpose, a starting air pump 21, which is activated only in the starting phase of the combustion engine, and a fuel pump 22, which pumps fuel from a fuel tank 23, are started up. For many carburetors, the fuel pump may be omitted, and the fuel is fed into the carburetor by creating an underpressure in the carburetor.

The working gas is ignited by an ignition rod 19, which has several ignition points along its length, and an explosion cycle of the combustion engine is initiated. Such an ignition rod is formed as a central electrode surrounded by an insulation body and provided at its end projecting from the combustion chamber with a connector for connection with an ignition cable. The combustion gas, which is formed by the explosion and is under an initial overpressure of theoretically not more than 9 bar, closes the check valve 24 and flows into the pump chamber 1 and acts on a flexible diaphragm 3 which, at the start of the explosion cycle, is in the first operational position shown by a continuous line in FIG. 1. The diaphragm 3 divides the interior space of the pump chamber into a gas space 30, which is connected with the combustion chamber 2, and a liquid space 31 (reference symbol 30 in FIG. 1 for the gas space refers to the position of the diaphragm 3 shown by the broken line). The diaphragm 3 is prestressed in the first operational position, which is drawn by a solid line in FIG. 1 and in which the liquid space 31 occupies essentially the whole volume of the pump chamber 1. The diaphragm 3 is stretched by the combustion gas under pressure, is blown up in a balloon-like manner, and is displaced into the second operational position, which is shown by a broken line in FIG. 1 and in which the gas space 30 occupies the bulk of the volume of the pump chamber 1. When the diaphragm 3 is displaced from the first operational position into the second operational position, the pump liquid, which fills the liquid space 31 of the pump chamber 1, is forced out through the liquid outlet opening 36, with the check valve 6, which is disposed in the liquid outlet opening 36, being opened and the check valve 8, which is disposed in the liquid inlet opening 38, being closed.

Advantageously, the volume of the combustion chamber 2 and the pump chamber 1 are dimensioned so that the pressure of the combustion gas, when it has pushed the diaphragm 3 into the second operational position, is reduced approximately to atmospheric pressure. The average pressure for the duration of the explosion cycle is, for example, 2 bar.

To provide for implosion cycle, the spray device 37, which is fed with cooling liquid from the pump 16, is activated by the control device 13, and the cooling liquid is sprayed from the spray nozzles 7 into the gas space 30 of the pump chamber 1. As a result of the spraying of the cooling liquid, the temperature and, with that, the pressure of the combustion gas are lowered suddenly, and a reduced pressure is established in the gas space 30 (the average pressure in the implosion cycle is approximately 0.6 bar, that is, an underpressure of 0.4 bar exists on average). This pressure difference provides for two processes. On one hand, the combustion chamber 2 is filled with fresh working gas, with a very good flushing of the spent combustion gas being achieved by the elongated shape of the combustion chamber. On the other hand, a pressure force is applied to the diaphragm 3 causing its movement from the second operational position in the direction of its first operational position. At the same time, the check valve 8, which is located in the liquid inlet opening 38, opens up, and the pump liquid is fed into the enlarged liquid space 31 of the pump chamber 1. While the diaphragm 3 is moving from its second operational position in the direction of its first operational position, the pressure in the gas space 30 increases, until atmospheric pressure is reached once again. Since the check valve 9 was opened at the end of the explosion cycle, the check valve 49 opens up as soon as the pressure in the gas space 30 exceeds atmospheric pressure, and the combustion gas, together with the cooling liquid, can flow into the exhaust pipe 25. The displacement of the diaphragm 3 by the still remaining distance to the first operational position takes place, on one hand, as a result of the already acquired kinetic energy of the inflowing pump liquid and, on the other hand, due to the inherent prestress of the diaphragm 3, with the remaining combustion gas, as well as the cooling liquid being conveyed into the exhaust pipe 25. In the exhaust pipe 25, a cooler 18 is provided, which acts as a trap for the cooling liquid, which is accumulated in the reservoir 15 mounted at the bottom of the cooler 18, while the combustion gas flows out of the exhaust 35.

Consequently, the shut-off valve 9 is closed by the control device 13 over a hydraulic line 34, and an ignition pulse is communicated by the control device 13 to the ignition rod 19 for initiation of a further explosion cycle. Instead of being controlled hydraulically, the shut-off valve 9 can also be controlled in a different manner, for example, pneumatically.

The check valve 8 in the liquid inlet opening 38 is formed by a series of rubber-like, flexible tapes 11, which overlap in shingle fashion, are stretched transversely over the inlet opening, and are connected at their narrow lateral ends firmly with the pump chamber 1. During the explosion cycle, the tapes 11 are pressed against one another and against the external collection grid 12. On the other hand, during the implosion cycle, the tapes rise up scale-like in the direction of the interior of the pump chamber 1, as shown by the broken line in FIG. 3 and open the liquid inlet opening 38. As a result of their elastic properties, the tapes 11 are pretensioned in the closed position of the check valve 8.

The check valve 6 in the liquid opening outlet 36 is constructed in an analogous manner. In this case, the collection grid is disposed internally and the flexible tapes straighten up in the direction of the outside of the pump chamber when the valve 6 is opened.

Because of the wedge-like shape of the pump chamber 1, which enlarges from the region, at which the combustion chamber 2 is disposed, up to the outlet opening 6, the pump liquid is displaced from the liquid space 31 by being squeezed through the outlet opening 36, starting from the tip of the wedge, with liquid inclusions being avoided. Likewise, in the implosion cycle, gas inclusions in the gas space 30 of the pump chamber 1 are avoided because of a similar squeezing from the wedge tip.

The diaphragm 3 is formed of a rubber-elastic material with sufficient resistance to mechanical and thermal stresses. For example, temperature-resistant silicone mixtures are suitable for this purpose. The cooling liquid, sprayed in during the implosion cycle, preferably sprays the entire surface of the diaphragm 3, facing the gas space. By these means, a moisture film is formed as protection against high temperatures of the combustion gases flowing in during the next explosion cycle.

The combustion chamber flow consists of a material having low thermal conductivity, and the walls of the combustion chamber 2 are cooled only to an extent, by the emission of heat to the environment, which prevents the self-ignition temperature of the working gas in the combustion chamber 2 from being reached. Due to this increased temperature of the walls of the combustion chamber, the carbon monoxide emission from the combustion engine is decreased.

As fuels, hydrogen, methanol, ethanol, gasoline (without antiknock additives such as octane, etc.), other combustible gases and basically, also diesel fuel (which is pre-heated), can be considered. The control device 13 comprises an ignition coil and a contact breaker, which specify the ignition cycle, which can be adjusted by the power regulator 17. For example, a cycle number of 50 cycles per second or 100 cycles per second can be specified.

Figure 4:
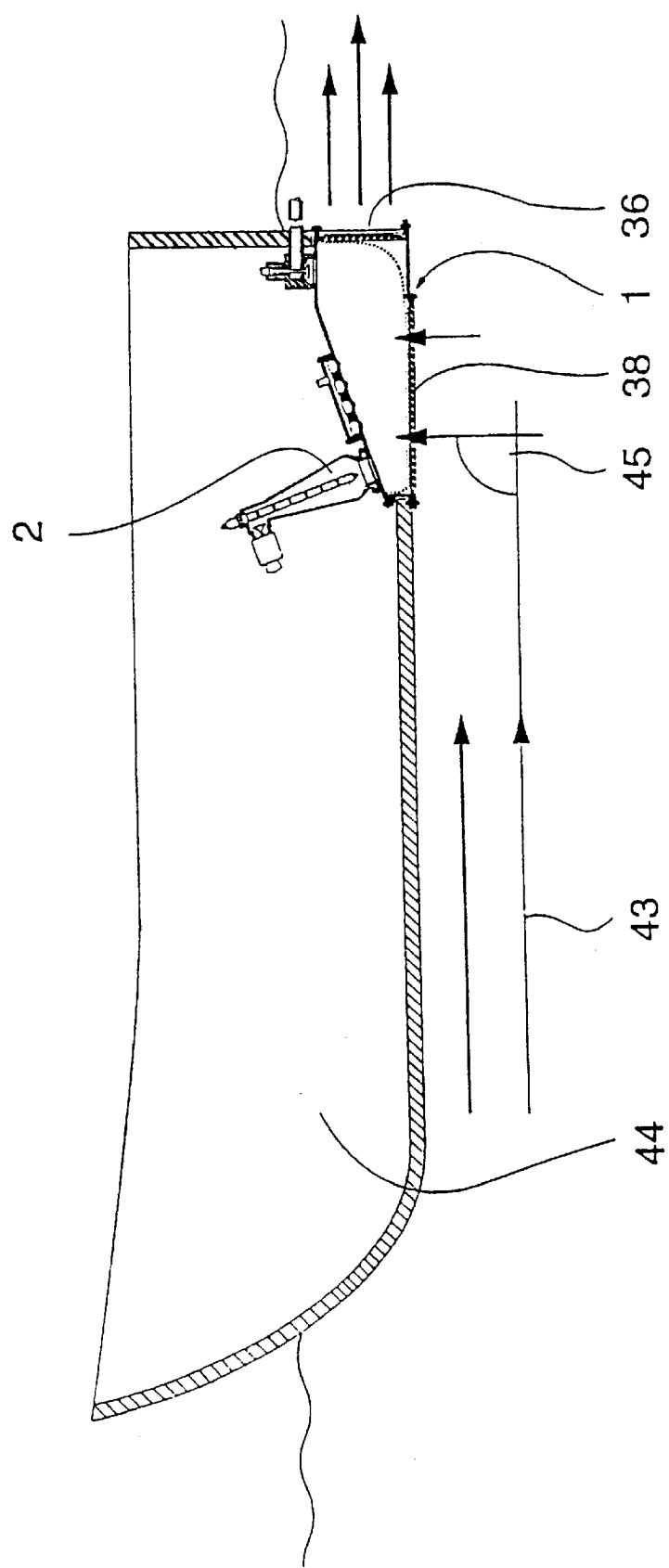
FIG. 4 shows a diagrammatic view of an inventive combustion engine as the driving mechanism for a boat.

In FIG. 4, the attachment of an inventive combustion engine to a boat 44, as the driving mechanism for the latter, is shown diagrammatically. In this case, water is used as the pump liquid and as the cooling liquid. The cooling liquid cooler and the cooling liquid trap in the exhaust pipe, as well as the reservoir for the cooling liquid can be omitted. The combustion engine is mounted on the boat in such a manner, that the liquid inlet opening 38 into the pump chamber forms an angle 45 of about 90° with the water flowing by, as a result of which a banking-up pressure, harmful to the efficiency, cannot build up at the liquid inlet opening. Advantageously, an injector pump, which is not shown in FIG. 4, is connected downstream from the combustion engine in order to convert the velocity of the water, flowing out of the outlet opening, into driving pressure.

A further embodiment of the inventive combustion engine is shown in FIGS. 5 to 9, in which similar parts have been designated with the same reference numbers. In the embodiment shown in FIGS. 5–9, the pump chamber 1 is disposed in a closed liquid circuit, which drives a multi-step turbine 134, which comprises rotors 135 stators 136. The turbine 134, disposed in the turbine housing 145, is connected rigidly with a shaft 137, from which a torque can be tapped. The blade angle of the turbine can be changed in a known manner over a control shaft 138 and a control device 139.

The difference between pump chamber 1 of the embodiment shown in FIGS. 5–9 and that shown in FIGS. 1 to 4 consists in that instead of a check valve, a controllable inlet valve 108 is disposed in the liquid inlet opening and is actuated by the control device 13, as it will be described below.

Figure 5:
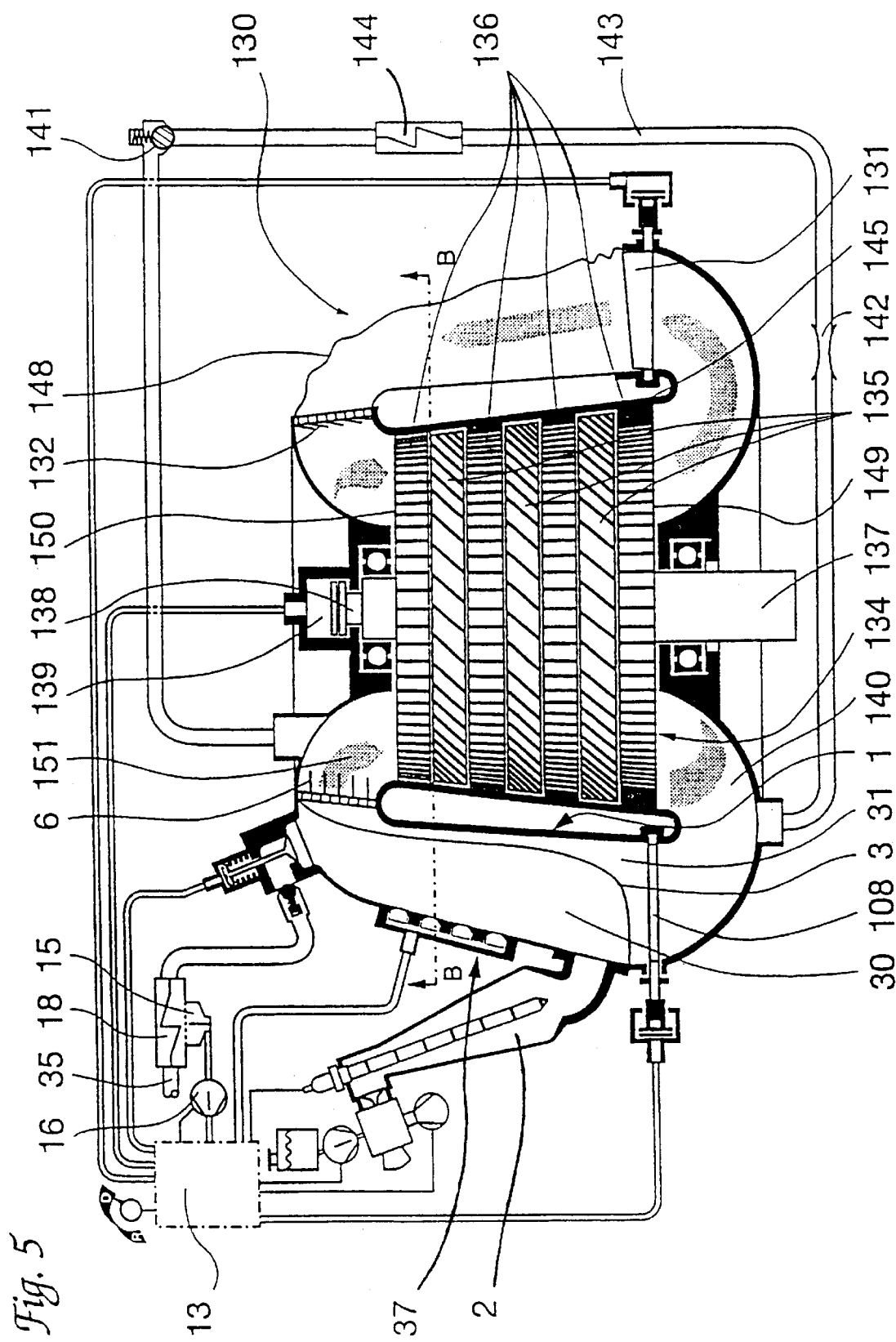
FIG. 5 shows a diagrammatic cross-sectional view along the line C—C of FIG. 9 of an embodiment of an inventive combustion engine, for which a closed cycle is provided, during the explosion cycle.

FIG. 5 shows the state of the combustion engine at the end of the explosion cycle, the flow of pump liquid being shown with arrows 151. At the beginning of the explosion cycle, the controllable inlet valve 108 is closed by the control device 13. The combustion gas, flowing out of the combustion chamber 2, acts on the diaphragm 3 and displaces it from its first operational position in the direction of its second operational position, with pump liquid being forced out of the check valve 6 into the liquid outlet opening of the pump chamber 1. The pump liquid reaches the turbine 134 through the turbine inlet 150, drives the turbine 134, and emerges from the turbine outlet 149.

At the start of the explosion cycle, the inlet valve 131 of the interim reservoir 130 is opened by the control device 13, so that the pump liquid, which has passed through the turbine 134, can flow into the interim reservoir 130. Since the interim reservoir 130, which is largely empty at the start of the explosion cycle, also has flexible walls 148, its volume is increased. The check valve 132 at the outlet of the interim reservoir 130 remains closed due to the pressure of the liquid flowing out of the pump chamber 1. In the state, shown in FIG. 5, the interim reservoir 130 has already expanded approximately to its maximum volume, which is reached at the end of the explosion cycle.

At the very end of the explosion cycle, when the diaphragm 3 has reached its second working position, in which the gas space 30 essentially occupies the whole volume of the pump chamber, the inlet valve 131 of the interim reservoir 130 is closed, and the inlet valve 108 of the pump chamber 1 is open. Cooling liquid is sprayed into the gas space 30 by the spraying device 37, as a result of which the implosion cycle is initiated. Because of the reduced pressure developing in the pump chamber 1, initially the check valve 6 in the liquid outlet opening of the pump chamber 1 is closed. Furthermore, the check valve 132 in the outlet of the interim reservoir 130 is opened and the pump liquid, stored in the interim reservoir 130, can flow preferably completely out of this interim reservoir 130 and, through the turbine inlet 150, the turbine 134, the turbine outlet 149, the turbine discharge chamber 140, and the inlet valve 108, into the liquid space 31 of the pump chamber 1.

Figure 6:
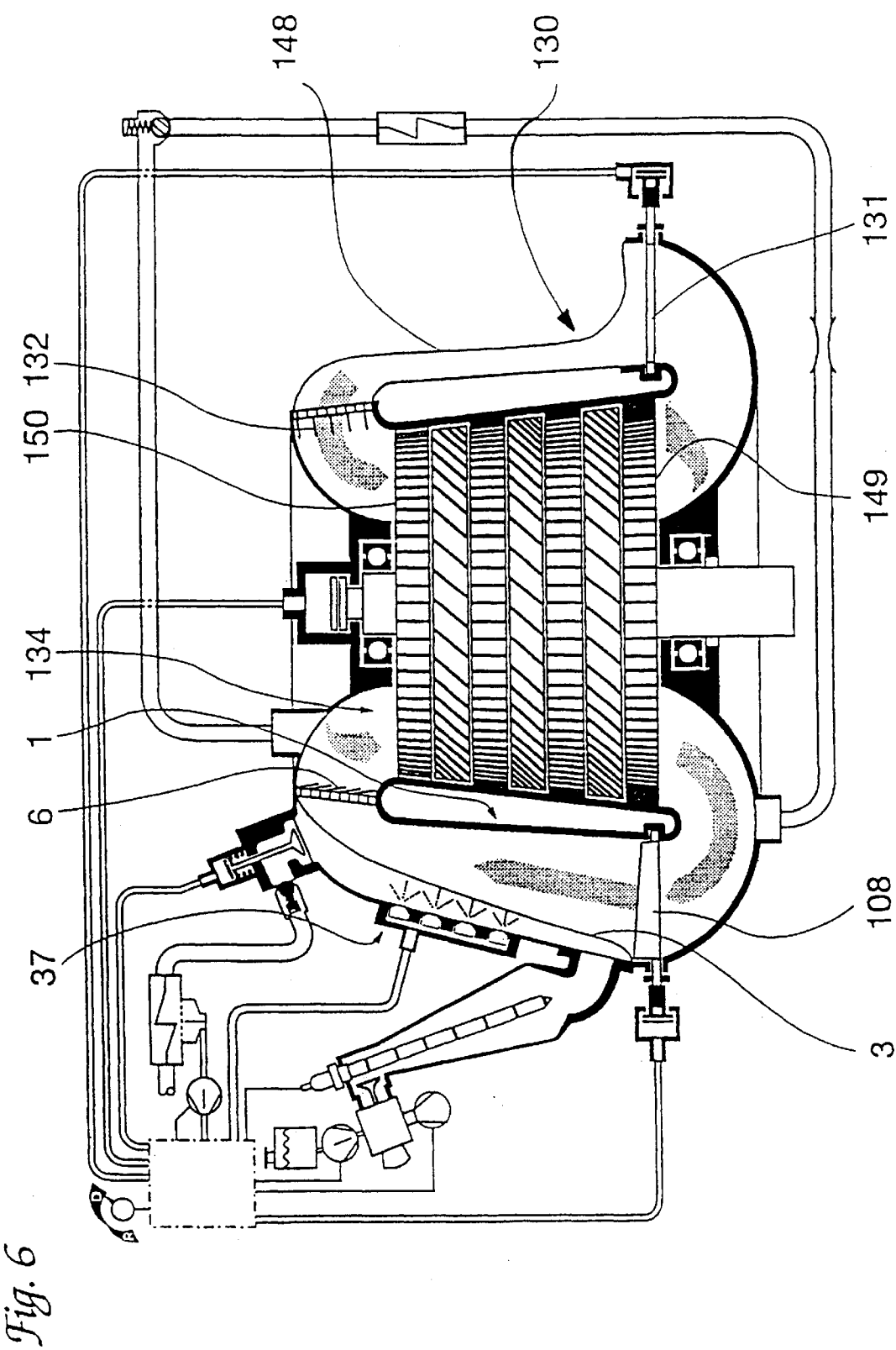
FIG. 6 shows a diagrammatic view of the combustion engine shown in FIG. 5 during the implosion cycle.

In FIG. 6, the state of the combustion engine at the end of the implosion cycle is shown. The interim reservoir 130 has already been emptied and the diaphragm 3 has been pushed back by a substantial amount in the direction of its first operational position. When the pressure in the gas space 30 increases above atmospheric pressure, the check valve 47 opens up and the remainder of the combustion gas can flow out of the gas space 30 of the pump chamber 1 (the check valve 9 has been open since the start of the implosion cycle).

Since the average pressure difference resulting from the explosion pressure in the explosion phase is larger than the pressure difference due to the implosion pressure in the implosion phase (for example, 2.5 bar average overpressure in the explosion phase, 0.4 bar average underpressure in the implosion phase), the liquid outlet opening of the pump chamber is larger and, for the pressure ratio given, preferably almost twice as large as the outlet opening of the interim reservoir, as a result of which the discharging rates are matched to one another.

Figure 7:
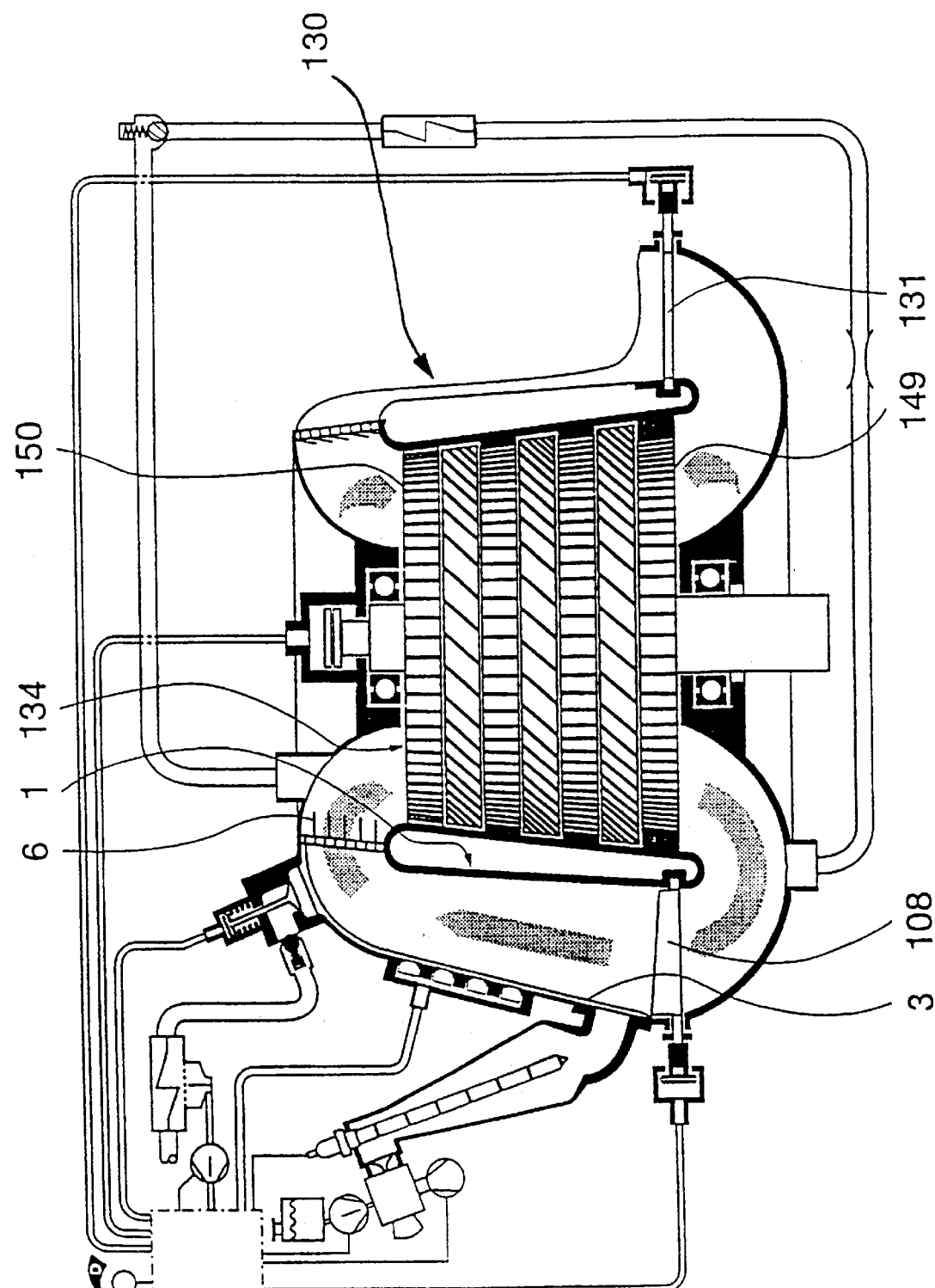
FIG. 7 shows a diagrammatic view of the combustion engine shown in FIG. 5 in an idling condition.

In FIG. 7, the idling state of the combustion engine is shown. The idling state is a state when there is no further explosion cycle at the end of the implosion cycle, the inlet valve 108 remains open and the inlet valve 131 remains closed. The check valve 106 opens up and the pump liquid flows through the turbine 134 and the pump chamber 1 as if they were a bypass.

Furthermore, the blade angle of the turbine 134 can be changed so far that the direction of rotation of the turbine 134 is reversed while the direction of flow of the liquid remains the same. A reversing gear can be realized in this manner without an additional transmission.

Figure 8:
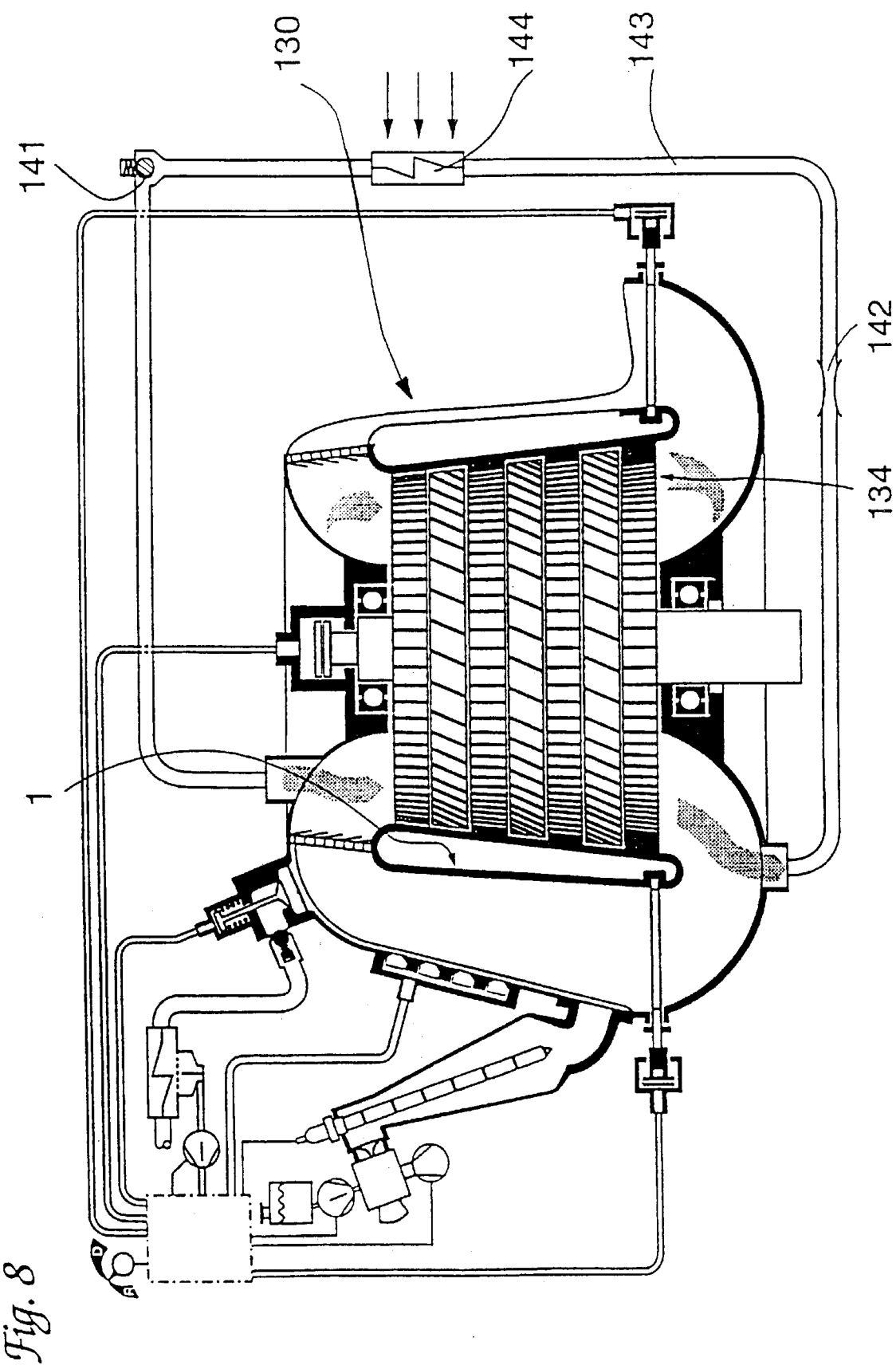
FIG. 8 shows a diagrammatic view of the combustion engine of FIG. 5 when used as an engine brake.

In order to provide an engine brake, the function of which is explained with reference to FIG. 8, the liquid circuit has a further branch 143, which connects the turbine outlet 149 with the turbine inlet 150 and which lies parallel to the branch in which the pump chamber 1 is disposed. For starting the engine brake, the inlet valves 131 and 108 are closed. The pump liquid flows from the turbine outlet 149 to the check valve 141 and is throttled in the throttle 142, becoming hotter in the process. Over the cooler 144, it returns to the main circuit and to the turbine inlet 150. Instead of or in addition to the throttle 142, a generator could also be provided for generating electrical energy.

Figure 9:
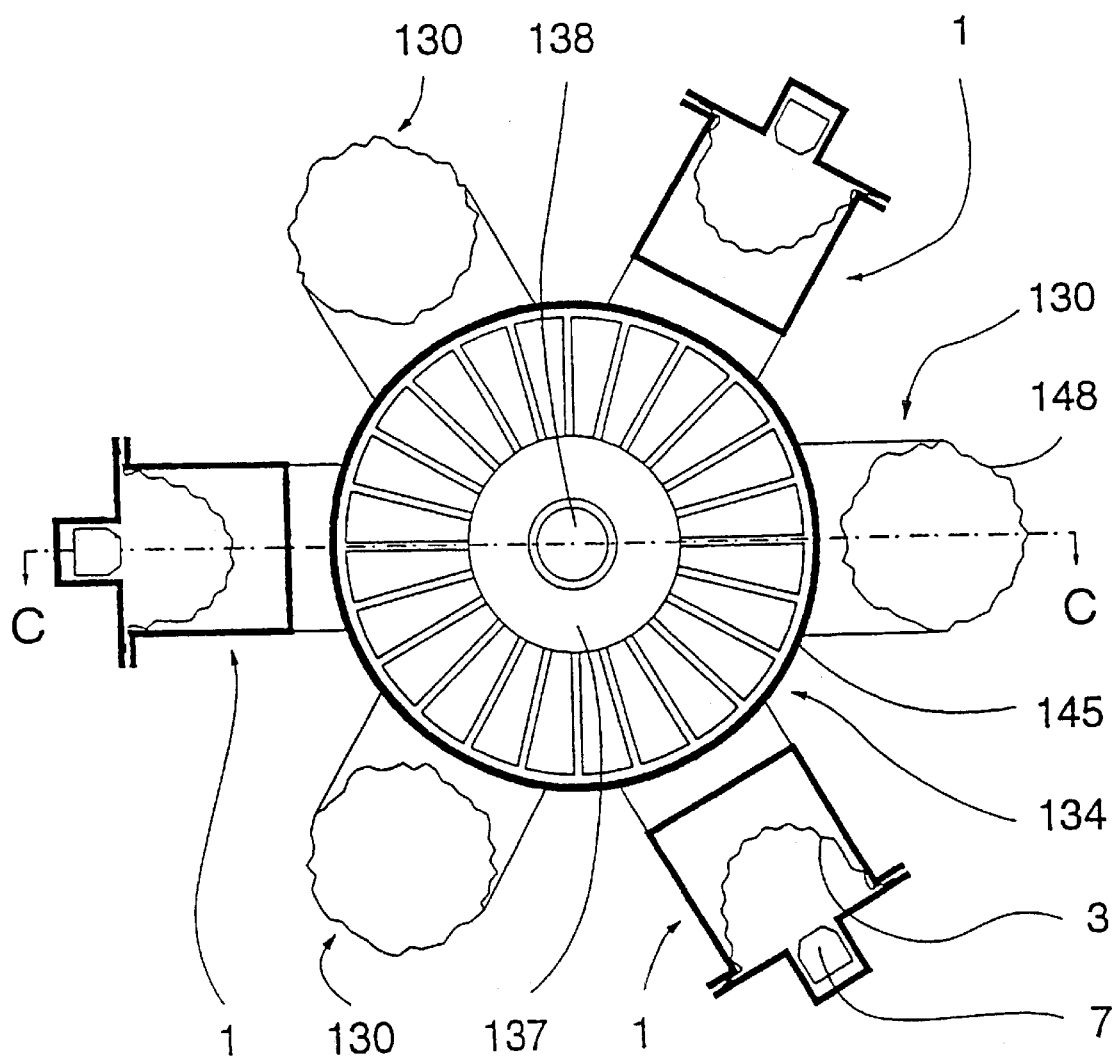
FIG. 9 shows a cross-sectional view along line B—B in FIG. 5.

It can be seen from the view shown in FIG. 9 that, in the case of the embodiment shown, several pump chambers and several interim reservoirs are connected parallel to one another, the explosion cycles and the implosion cycles of the pump chambers as well as the inlet valves of the pump chambers and the interim reservoirs being synchronized.

In the case of a practical realization of the invention, it was possible to attain an output of 30 horsepower in the case of a pump chamber volume of 1 L, with the real efficiency η-eff being 0.46.

Another, particularly preferred embodiment of the present invention is shown in FIGS. 10 to 14.

In order to start this combustion engine, a combustion chamber 202 is filled once again with a working gas which is formed in a carburetor 220 and is essentially at atmospheric pressure in the combustion chamber 202. For this purpose, a starting air pump 221, which is activated only in the starting phase of the combustion engine, is actuated. Most fuels do not require their own fuel pump for pumping the fuel contained in the fuel tank 223. Either the fuel is a gas, which is anyhow under pressure, or the fuel is pumped as a result of the underpressure in the carburetor 220.

The working gas is ignited over an ignition rod 209, which has several ignition points along its length, and an explosion cycle is initiated in the combustion engine. The combustion gas, formed by the explosion and under pressure, closes the check valve 224 and flows into the pump chamber 201.

The pump chamber 201 has a shape, which is essentially rotationally symmetrical, and the combustion chamber 202, which also has a rotationally symmetrically shape, is disposed centrally at the pump chamber 201 so that its longitudinal axis coincides with the longitudinal axis of the pump chamber 201. Furthermore, combustion chamber 202 is connected with pump chamber 201 over several combustion gas inlet openings 250 of the pump chamber 201.

Figure 10:
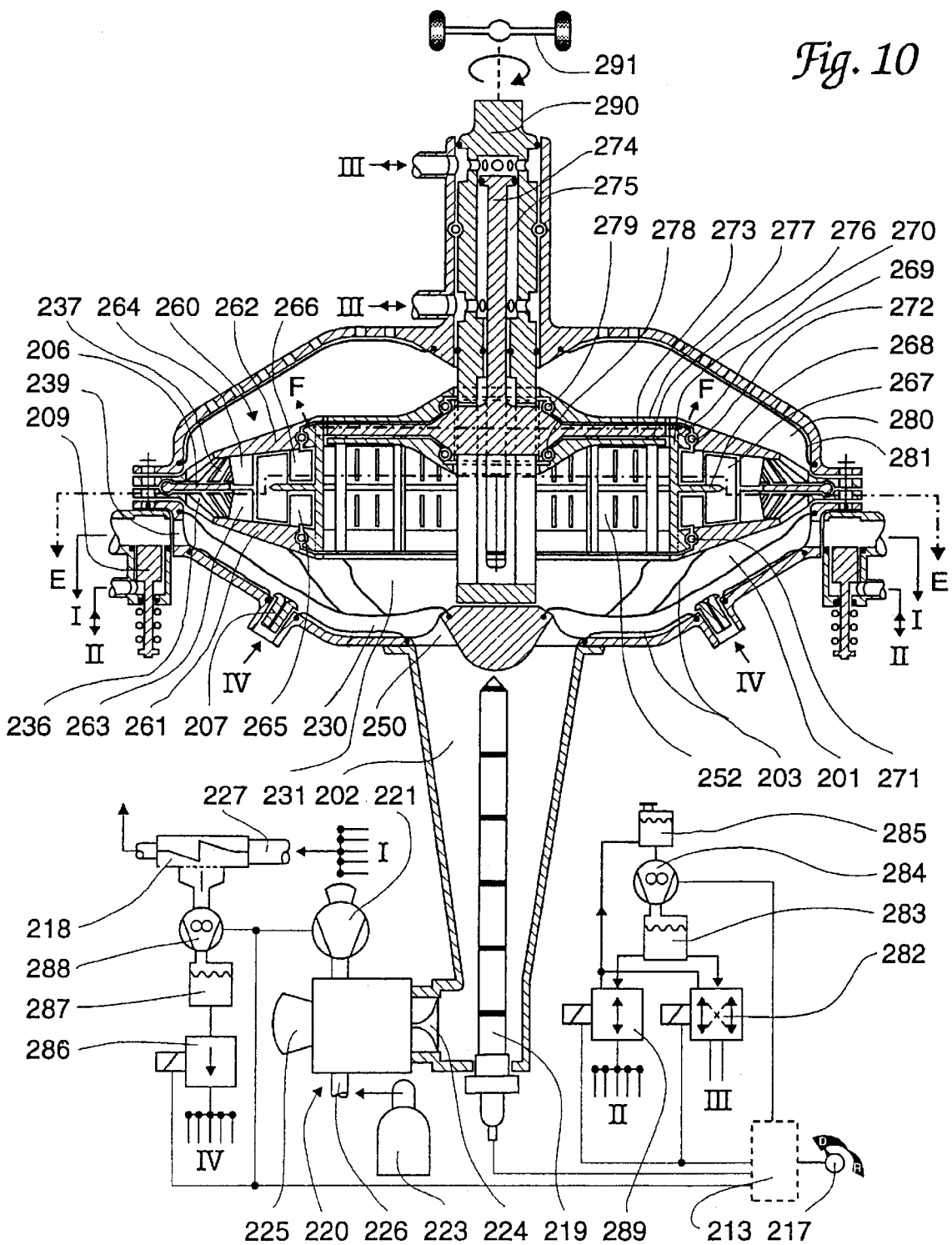
FIG. 10 shows a diagrammatic longitudinal cross-sectional view along line D—D of FIG. 11 through the central longitudinal axis of a second embodiment of an inventive combustion engine.
Figure 11:
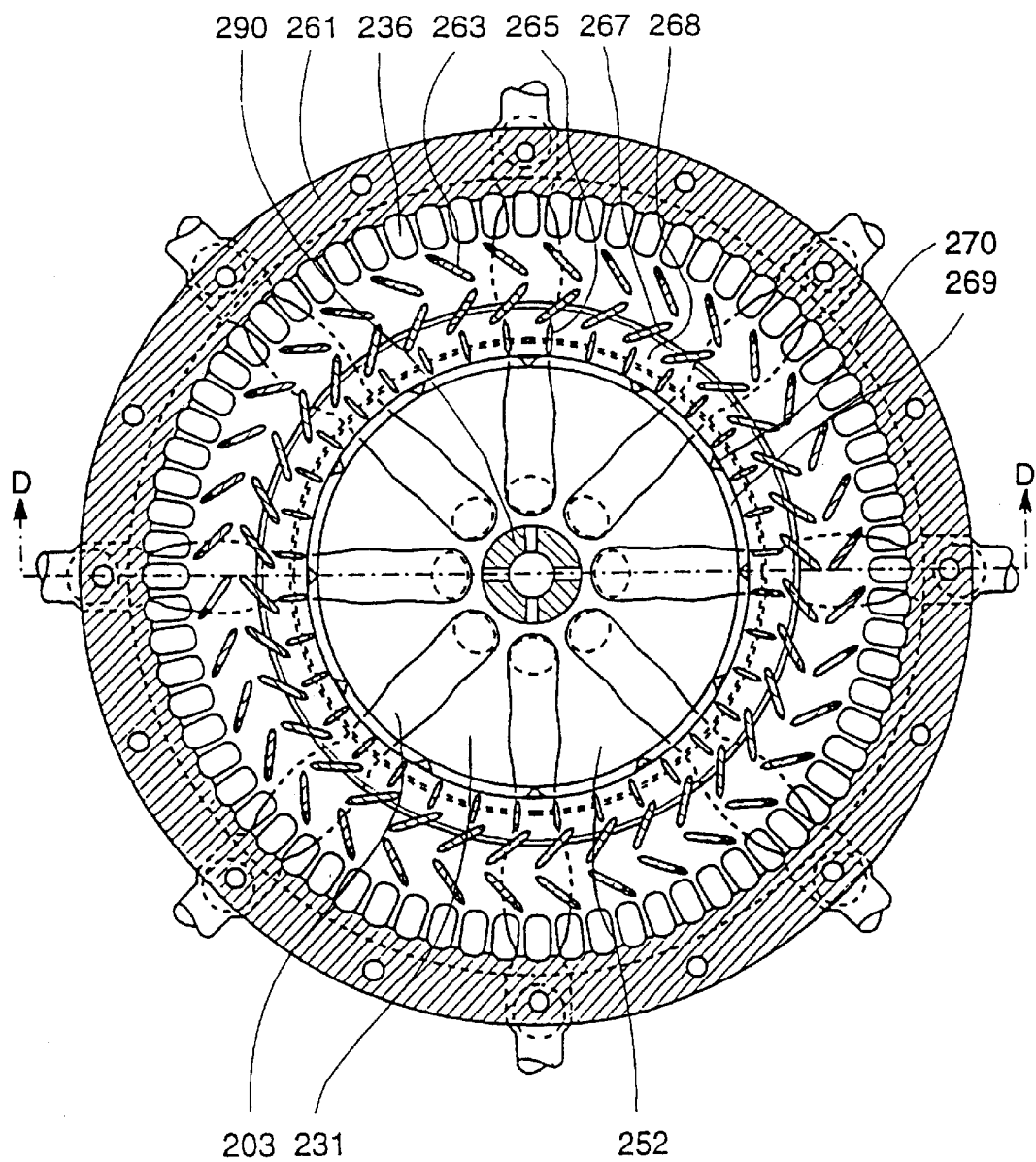
FIG. 11 shows a cross-sectional view along line E—E of FIG. 10.
Figure 12:
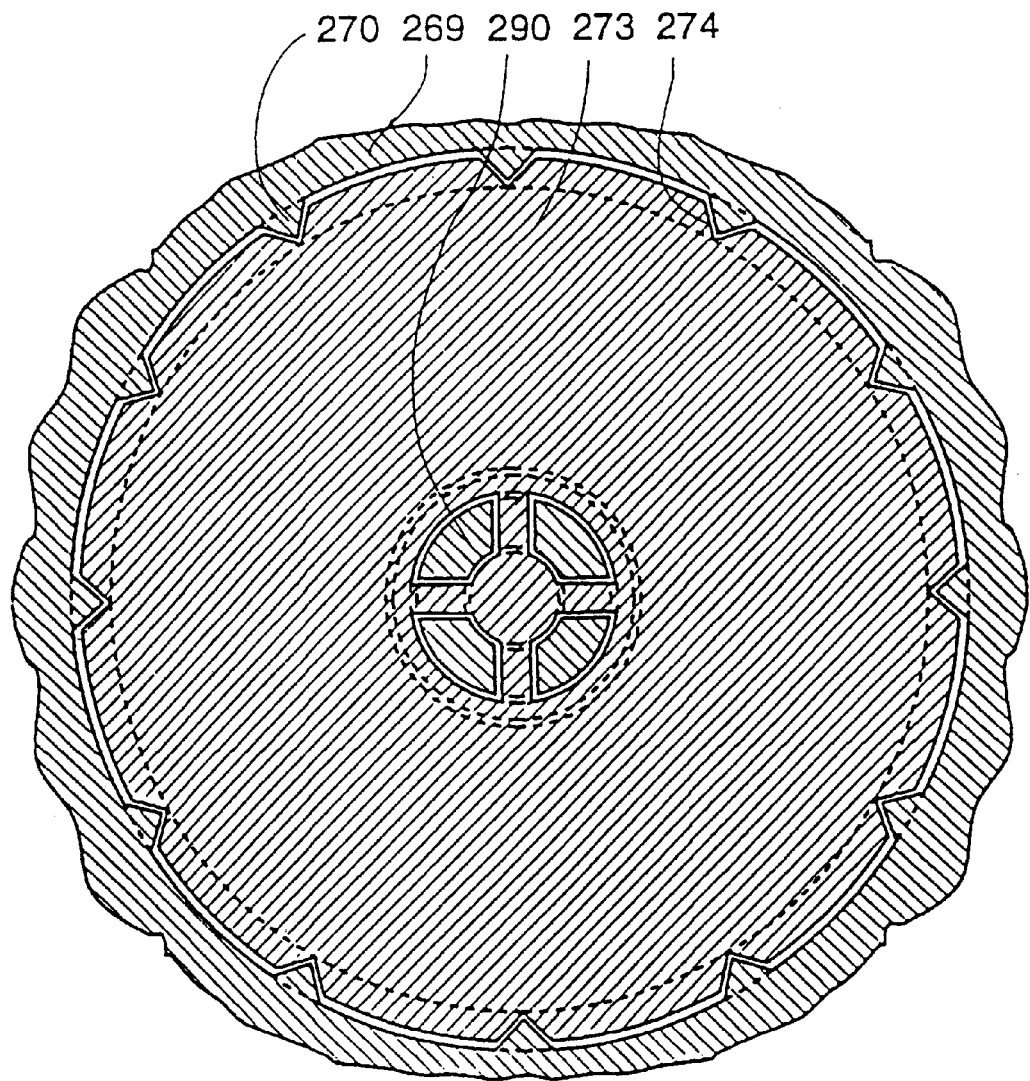
FIG. 12 shows a cross-sectional view along line F—F of FIG. 10.
Figure 15:
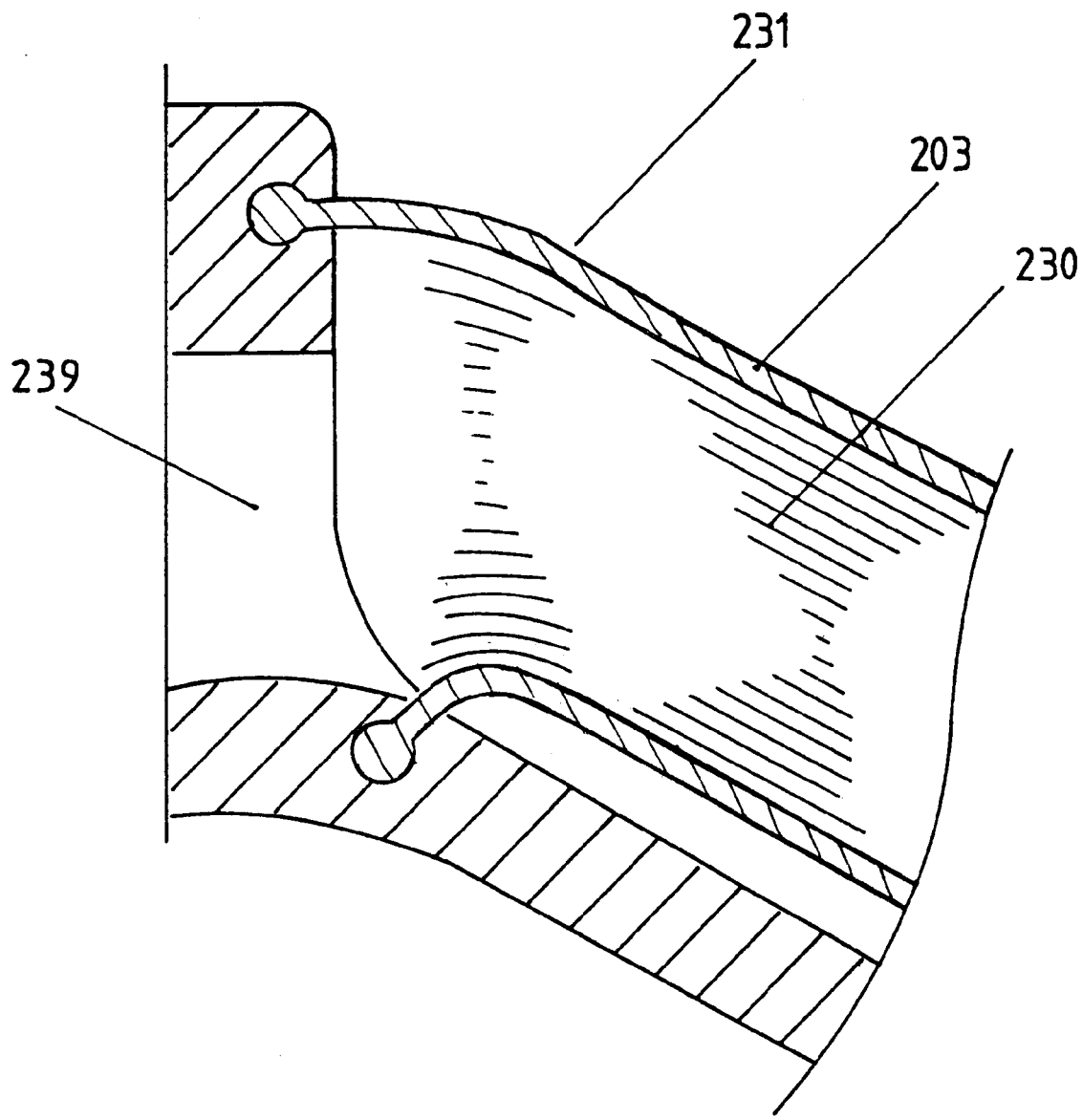
FIG. 15 shows a schematic view illustrating separation of gas and liquid spaces.

In the pump character 201, several flexible, elastic tubular diaphragms 203 are provided. The tubular diaphragm 203 in each case connects a combustion gas inlet opening 250 with one of the combustion gas outlet openings 239. The tubular diaphragms 203 are disposed radially, in spoke fashion, in the pump chamber 201 and divide the pump chamber 201 into a liquid space 231 and gas space 230, which is formed by the interior spaces of the tubes;

In the embodiment of FIGS. 10–14, the liquid space 231 is separated from the gas space 230 by flexible tubes that form the diaphragm 203. The tubes extend between the combustion gas inlet 250 and the combustion gas outlets 239. The inner space of the tubes, forms the gas space 230, and the space outside of the tubes forms the liquid space 231 (FIG. 15). FIG. 11 shows a plan view of inwardly located positions of the radially extending tubes which for the diaphragm 203. The outwardly extending portions of the tubes are shown with dash lines. FIG. 10 shows a cross-section along line D—D in FIG. 11. Viewed from below, the tube is cut to form left and right portions. In the rear, viewed from below, part of the FIG. 10, a side view of two tubes is shown.

Figure 13:
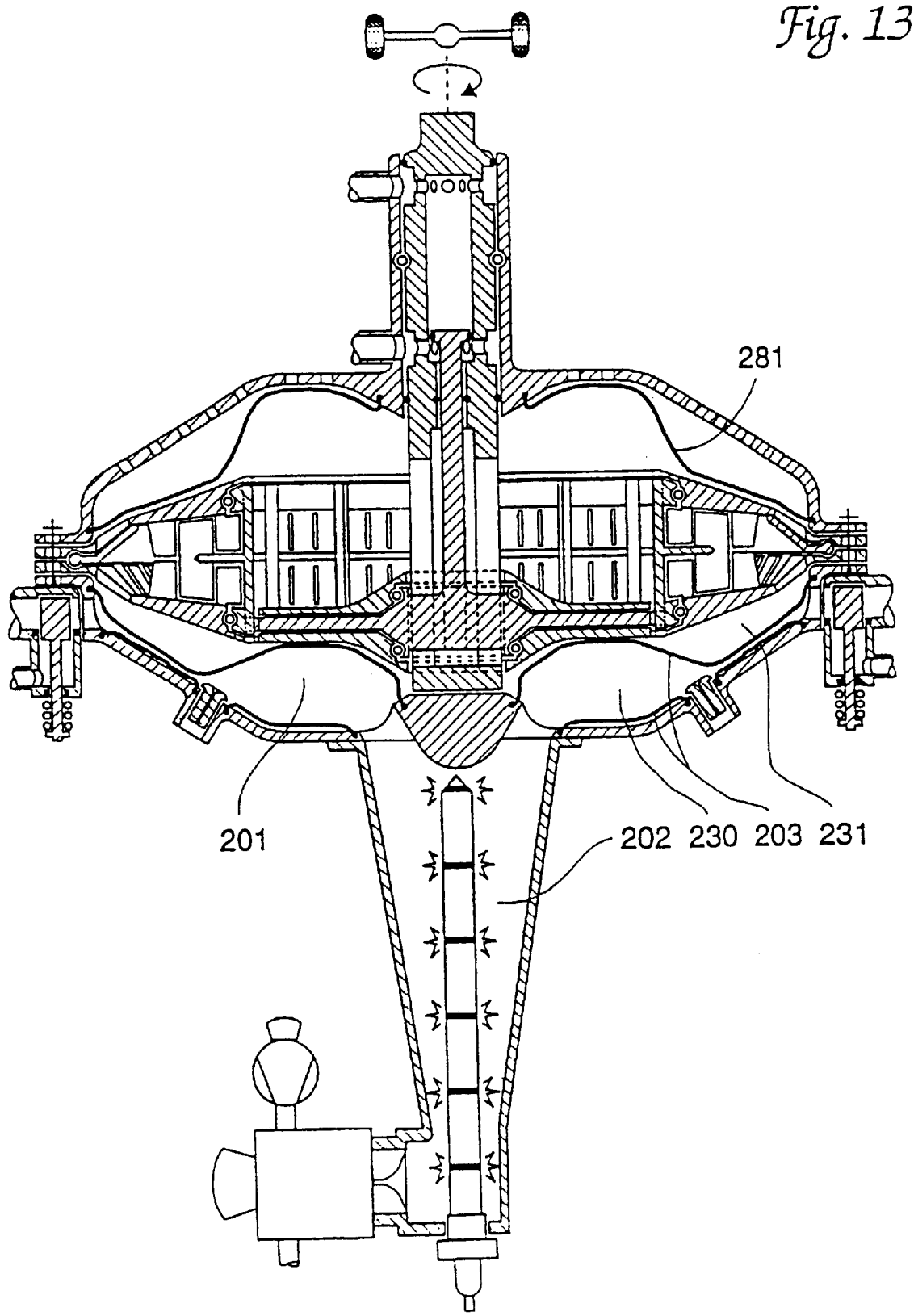
FIG. 13 shows a view illustrating the state of the combustion engine during the explosion cycle.
Figure 14:
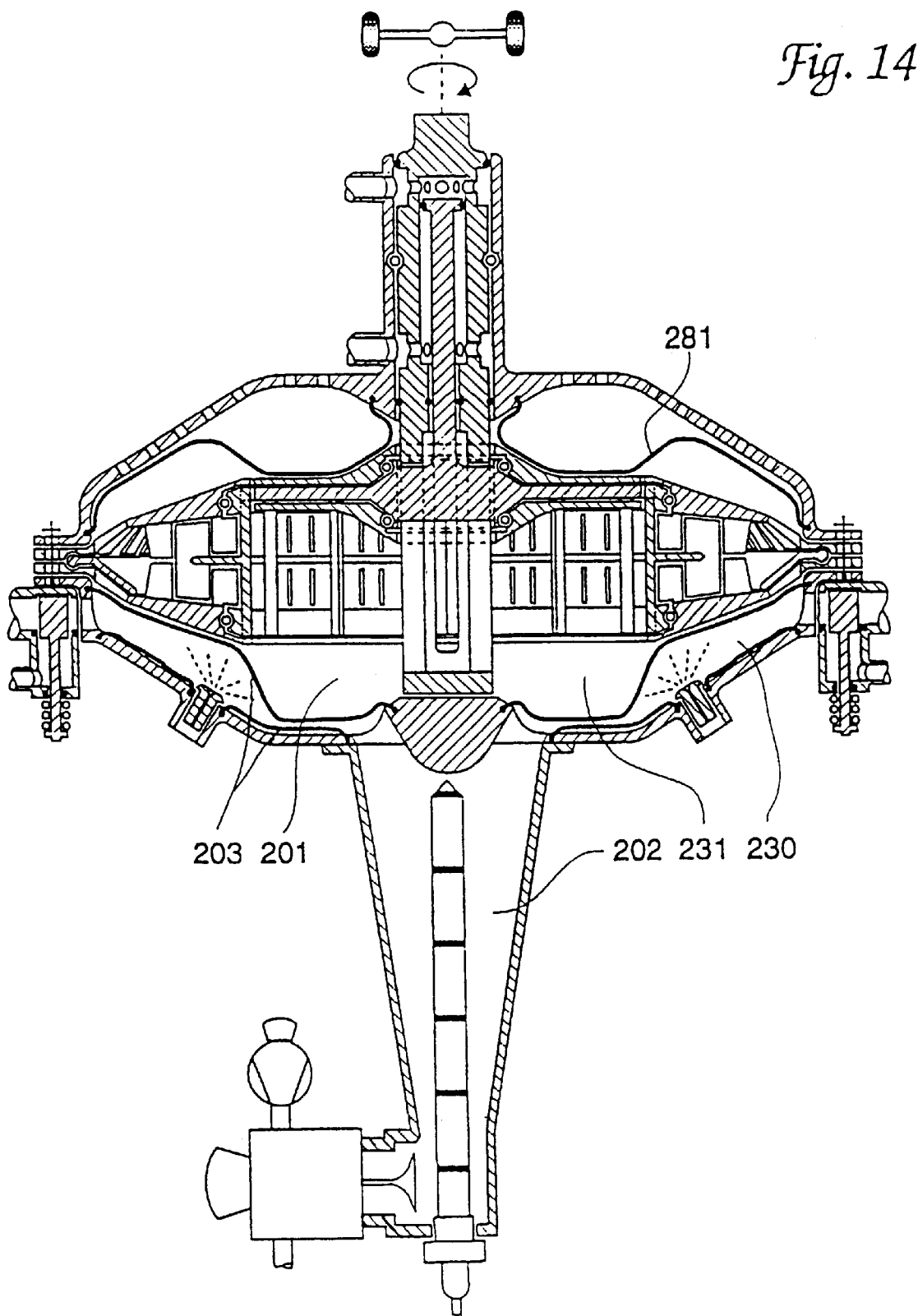
FIG. 14 shows a view illustrating the state of combustion engine during the implosion cycle.

At the beginning of the explosion cycle, the combustion gas outlet valves 209 are closed, and the valve disk 273 is in its lower end position in which it closes off the liquid inlet opening 252 into the pump chamber 201, as shown in FIG. 13. Furthermore, at the beginning of the explosion cycle, the tubular elastic diaphragms 203 are emptied, and the liquid space 231, which is filled with pump liquid, takes up essentially the whole volume of the pump chamber 201.

The combustion gas, expanding from the combustion chamber 202, fills the tubular elastic diaphragms 203 in the pump chamber 201 and, as a result, forces the pump liquid out of the liquid space 231 through the liquid outlet openings 236 of the pump chamber 201, which simultaneously form liquid inlet openings 236 for the turbine 260. Due to the pressure of the liquid flowing in, the lip 206 is pressed upward and, closes the liquid outlet openings 231 from the interim reservoir 230, which simultaneously form further liquid inlet openings into the turbine 260.

The turbine 260 is a radial turbine (in the form of a Francis turbine), in which the liquid flows radially through the turbine rotor. The turbine housing has disk-shaped, outwardly curved lower and upper housing parts 261, 262. As seen radially from the outside in, the lower and upper parts of the housing 261, 262 in each case have a ring of inlet openings 236, 237, an inlet vane ring 263, 264, a free space for the turbine rotors, an outlet vane ring 265, 266, and a central opening. The turbine rotor is formed by a turbine blade ring, which is fastened to an axially centered disk 268, which is rigidly connected with a squirrel cage rotor 269. The squirrel cage rotor 269 has a plurality of axially aligned rods 270, which are disposed circularly about the longitudinal axis of the machine, and is mounted rotatably at the upper and lower parts of the housing 261, 262 in radial bearings 271, 272. Within the squirrel cage rotor 269, a valve disk 273 is disposed, which accommodates the rods 270 in notches 274 at its edge (see FIG. 12). By these means, the valve disk 273 is rotationally locked with the squirrel cage rotor 269, but can be displaced axially with respect to the squirrel cage rotor 269. In the lower end position in the squirrel cage rotor 269, the valve disk 273 closes off the central opening in the lower part 261 of the housing of the turbine and, with that, the liquid inlet opening 252 in the pump chamber 201. In the upper end position of the valve disk 273 in the squirrel cage rotor, the valve disk 273 closes off the central opening in the upper part 262 of the housing of the turbine and, with that, the liquid inlet opening 253 (see FIG. 13) into the interim reservoir 260.

The valve disk 273 furthermore is connected with a drive shaft 290 for joint rotation therewith. The rotation of the drive shaft 290 can be transferred, for example, to the rear axle 291 of a motor vehicle. The rotation of the vane ring 267 is thus formlockingly transferred over the disk 268, the squirrel cage rotor 269 and the valve disk 273 to the driving axle 290. In order to be able to adjust the valve disk 273 between the first lower end position and the second upper end position in the squirrel cage rotor, the valve disk 273 is connected axially displaceably with the drive shaft 290, the axial displacement being effected with an actuating piston 274, which is disposed in a cylindrical recess 275 in the drive shaft 290.

The pump liquid, flowing out of the pump chamber 201 into the turbine, is directed by the inlet vane rings 263, 264 onto the turbine blade ring 267, subsequently radially by the outlet vane rings 265, 266, and flows through the liquid inlet opening 253 into the interim reservoir 280. The volume of the latter can be changed by a flexible diaphragm or wall 281, with the inflowing liquid, as shown in FIG. 13, pressing the wall 281 upward (commencing on the inside and continuing towards the outside) whereby the volume of the interim reservoir 280 is increased.

In order to avoid contact between the valve disk 273 and the flexible wall 281 of the interim reservoir 280 or the diaphragm 203 of the pump chamber 201, covering disks 276, 277 are provided above and below the valve disk 273 and are mounted rotatably over bearings 278, 279 with respect to valve disk 273.

The explosion cycle ends when essentially all pump liquid has been displaced from the pump chamber 201. The tubular diaphragms 203 lie tightly next to one another, and the gas space 230 of the pump chamber 201 occupies essentially all of the volume of the pump chamber 201. Thus, as far as possible, all of the pressure energy of the combustion gas can be utilized, with the pressure of the combustion gas having at this time been reduced approximately to atmospheric pressure. This is achieved due to the fact that the ratio of the volume of the combustion chamber 202 to that of the pump chamber 201, which always remains constant, is selected, depending on the fuel used and on the burner charge, with the volume of the pump chamber 201 being significantly larger, for example, approximately five times as large as the volume of the combustion chamber 202. If the burner charges remain constant, the time, which is required for an explosion cycle, is also constant and, at the end of this time, the control device 213 displaces the valve disk 273 from its lower end position into the upper end position. For this purpose, there are provided a hydraulic fluid pressure tank 283 to which pressure is communicated by a pump 284 from a tank 285, and a valve 282, which is controlled by a control device 213 and over which pressure is communicated to the piston 274.

Furthermore, towards the end of the explosion cycle, a cooling medium, preferably a cooling liquid, is sprayed by spray nozzles 207 into the gas chamber 230 of the pump chamber 201, in order to initiate the implosion cycle. For this purpose, a valve 286 is opened by the control device 213 and connects a cooling liquid pressure tank, to which the cooling liquid is fed by a pump 288, with the spray nozzles. By spraying in the cooling liquid, the volume of the hot combustion gas is reduced suddenly, and an underpressure is developed in the gas space 230 of the pump chamber 201. This underpressure has a twofold effect. On one hand, it provides for aspiration of spent combustion gases out of the combustion chamber 202 (which, at the same time, also implodes), so that the valve 224 opens and a new mixture is fed through the inlet 225 and over the fuel line 226 into the combustion chamber 202. The flow rate of the mixture is adjusted by throttles, which are not shown in the Figures. Furthermore, the pump liquid is aspirated, as a result of the underpressure in the gas space 230 of the pump chamber 201, out of the interim reservoir 280 through the turbine 260. The pump liquid flows through the liquid outlet openings 237 of the interim reservoir 280, which at the same time form the liquid inlet openings 237 of the turbine, through the inlet vane rings 263, 264 onto the turbine blade ring 267, through the outlet vane rings 265, 266, and the turbine outlet opening 252, which at the same time forms the liquid inlet opening into the pump chamber 201. In this way, the thermal energy of the combustion gas is also utilized to drive the turbine 260. The pump liquid, flowing into the liquid space 231 of the pump chamber 201, squeezes the tubular diaphragms 203, from inside out (that is, reduces their volume starting from the inside and continuing to the outside) and, in so doing, initially closes off the outlet openings 250 of the combustion chamber 202, with the check valve 224 also being closed. At this time, the rinsing process of the combustion chamber 202 has just been concluded.

Shortly thereafter, the volume of the gas space 230 of the pump chamber 201 decreases to an extent at which the combustion gas in the gas space 230 approximately reaches atmospheric pressure. Approximately at this time, which once again occurs at a certain constant time period after the ignition, the control device 213 opens the combustion gas outlet valves 209 by actuating valve 289. The remaining combustion gas is now forced by the kinetic energy of the liquid, which flows out of the interim reservoir 280, out of the combustion gas outlet openings 239 into the exhaust pipe 227, with the volume of the gas space 230 of the pump chamber 201 being reduced further. Together with the combustion gas, the cooling liquid is also displaced from the gas space 230 into the exhaust pipe 227, accumulates in the cooler 218, and is pumped by the pump 288 once again into the pressure tank 287.

The implosion cycle is thus ended, and the control device 231 closes the combustion gas outlet valves 209 and displaces the valve disk 273 into its lower end position. A new explosion cycle is initiated by the ignition of the working gas in the combustion chamber 202.

As it has already been mentioned, the power of the combustion engine, which can be adjusted by the actuator 217, is controlled not by charging the combustion chamber 202 differently but by omitting individual cycles, when power is not required, that is, there is no ignition of the working gas in the combustion space, the valves 209 remain closed and the valve disk 273 remains in its upper end position. As it has already been described above, the turbine 260 is a radial turbine in the form of a Francis turbine and works with slippage with respect to the liquid flowing through. However, in the case of the inventive closed system, a high liquid slippage in the turbine does not mean an overall deterioration in the efficiency, since kinetic energy or pressure of the pump liquid, which is not converted during the passage through the turbine, can be supplied once again to the inlet of the turbine. In other words, kinetic energy of the pump liquid, which is not converted by the turbine during the primary passage, is incorporated in the closed cycle as hydraulic centrifugal kinetic energy. Thus, the adjustment of the turbine blades and/or the guide vanes can be dispensed with, and the rotational speed and the torque are automatically controlled dynamically by increased or decreased slippage of the pump liquid in the turbine. The speed at which the pump liquid is circulated is once again determined by the burner performance, which results from the frequency of the ignitions carried out.

In order to keep internal flow losses (friction and turbulences) as small as possible, the flow segment for the pump fluid was configured so that its cross-section, as far as possible, remains constant. Switching over the pump liquid from the pump chamber into the interim reservoir and the reverse take place in such a way that flows in the opposite directions do not meet (unrestricted hydraulic switching over).

The number of cycles of 100 per second is possible with the combustion engine described, and a 50 HP engine can be made available, which has a volume of about 5 liters and a weight of about 10 kg. About 3 liters of pump liquid are being cycled in the engine.

The walls of the combustion chamber can take on a relatively high temperature, in order to decrease harmful emissions. For this purpose, the burner is formed of a ceramic material and has cooling liquid pipelines in its walls in order to control the temperature.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A combustion engine, comprising a combustion chamber for combusting a fuel in an explosion cycle; and a pump chamber connected with the combustion chamber and having a liquid inlet opening through which a pump liquid flows into the pump chamber, and liquid outlet opening through which the pump liquid is ejected from the pump chamber under action of a combustion gas formed in the explosion cycle, wherein the combustion engine forms part of a circuit for the pump liquid, the circuit further including a turbine, driven by the pump liquid, and wherein an interim reservoir is provided, which is connected with an outlet of the turbine and is filled with pump liquid during the explosion cycle and is emptied during an implosion cycle.

2. The combustion engine of claim 1, wherein the volume of the interim reservoir is a variable volume changeable in accordance with an amount of pump liquid taken up.

3. The combustion engine of claim 2, wherein the interim reservoir has walls of a flexible material.

4. The combustion engine of claim 1, wherein the interim reservoir has an inlet opening, which is connected with the outlet of the turbine, and a controllable inlet valve for closing the inlet opening.

5. The combustion engine of claim 1, wherein the turbine is a radial turbine with a rotor disk through which the pump liquid flows essentially radially.

6. The combustion engine of claim 5, wherein the interim reservoir has essentially a rotationally symmetrical shape.

7. The combustion engine of claim 6, wherein the interim reservoir is formed essentially as a mirror image of the pump chamber.

8. The combustion engine of claim 5, wherein the turbine has a housing formed of disk-shaped upper and lower parts having each liquid inlet openings and central openings in a region of an outer edge thereof.

9. The combustion engine of claim 5, wherein the turbine is located between the pump chamber and the interim reservoir, the disk-shaped upper and lower parts of the turbine housing forming walls of the pump chamber and the interim reservoir.

10. The combustion engine of claim 1, wherein the turbine has an adjustable blade angle.

11. A combustion engine, comprising a combustion chamber for combusting a fuel in an explosion cycle; and a separate pump chamber, connected with the combustion chamber and having a liquid inlet opening through which pump liquid flows into the pump chamber, and a liquid outlet opening, through which the pump liquid is expelled from the pump chamber under the action of combustion gas formed in an explosion cycle, the separate pump chamber being divided a plurality of flexible tubular diaphragms into a gas space and a liquid space so that the combustion gas, flowing out of the combustion chamber into separate pump chamber, displaces the flexible diaphragms against the pump liquid, each diaphragm connecting a combustion gas inlet opening with a combustion gas outlet opening, with the gas space being formed by interior spaces of tubes forming the diaphragm.

12. A combustion engine, comprising a combustion chamber for combusting a fuel in an explosion cycle; a separate pump chamber connected with the combustion chamber and having a liquid inlet opening through which the pump liquid flows into the pump chamber, and a liquid outlet opening, through which the pump liquid is expelled from the pump chamber under the action of combustion gas formed in an explosion cycle, the separate pump chamber being divided by at least one flexible diaphragm into a gas space and a liquid space so that the combustion gas, flowing out of the combustion chamber into the separate pump chamber, displaces the flexible diaphragm against the pump liquid; and a liquid trap arranged in an exhaust pipe connected with the combustion gas outlet opening of the gas space of the pump chamber for trapping cooling liquid.

13. A combustion engine, comprising a combustion chamber for combusting a fuel in an explosion cycle; and a separate pump chamber, connected with the combustion chamber and having a liquid inlet opening through which pump liquid flows into the pump chamber, and a liquid opening, through which the pump liquid is expelled from the pump chamber under the action of combustion gas formed in an explosion cycle, the separate pump chamber being divided by at least one flexible diaphragm into a gas space and a liquid space so that combustion gas, flowing out of the combustion chamber into the separate pump chamber, displaces he flexible diaphragm against the pump liquid, wherein the flexible diaphragm is formed of a rubber elastic, extensible material, wherein the pump chamber has a spraying device for spraying cooling medium into the gas space of the pump chamber; and wherein the spraying device is arranged for spraying a surface of the diaphragm facing the gas space.

14. The combustion engine of claim 13, further comprising a contrallable shut-off valve for closing the combustion gas outlet.

15. The combustion engine of claim 13, comprising several diaphragms having a tubular shape, each diaphragm connecting a combustion gas inlet opening with a combustion gas outlet opening, with the gas space being formed by interior spaces of the tubes.

16. The combustion engine of claim 13, wherein the flexible diaphragm has a first operational position, in which the liquid space occupies a bulk of a volume of the pump chamber, and a second operational position, in which the gas space occupies the bulk of the volume of the pump chamber.

17. The combustion engine of claim 13, wherein a working gas, which fills the combustion chamber at a start of the explosion cycle, is at atmospheric pressure.

* * * * *